(12) United States Patent
Bowman et al.

(10) Patent No.: US 12,434,318 B2
(45) Date of Patent: Oct. 7, 2025

(54) WELDING POWER SUPPLIES HAVING DYNAMIC CURRENT RESPONSES

(71) Applicant: Illinois Tool Works Inc., Glenview, IL (US)

(72) Inventors: Cody J. Bowman, Appleton, WI (US); Richard C. Joyce, Sherwood, WI (US)

(73) Assignee: Illinois Tool Works Inc., Glenview, IL (US)

( * ) Notice: Subject to any disclaimer, the term of this patent is extended or adjusted under 35 U.S.C. 154(b) by 982 days.

(21) Appl. No.: 17/538,443

(22) Filed: Nov. 30, 2021

(65) Prior Publication Data

US 2022/0143731 A1 May 12, 2022

Related U.S. Application Data

(63) Continuation-in-part of application No. 17/405,356, filed on Aug. 18, 2021, now Pat. No. 12,350,766.

(60) Provisional application No. 63/067,402, filed on Aug. 19, 2020.

(51) Int. Cl.
*B23K 9/095* (2006.01)
*B23K 9/10* (2006.01)

(52) U.S. Cl.
CPC .......... *B23K 9/1043* (2013.01); *B23K 9/0956* (2013.01)

(58) Field of Classification Search
CPC ... B23K 9/1043; B23K 9/0956; B23K 9/0953
See application file for complete search history.

(56) References Cited

U.S. PATENT DOCUMENTS

| | | | |
|---|---|---|---|
| 7,064,290 B2 | 6/2006 | Blankenship | |
| 2008/0296265 A1 | 12/2008 | Hiroi | |
| 2010/0224606 A1* | 9/2010 | Hutchison | B23K 9/0953 219/130.21 |
| 2011/0226749 A1 | 9/2011 | Sato | |
| 2013/0114306 A1 | 5/2013 | Kooken | |
| 2017/0225254 A1* | 8/2017 | Ulrich | B23K 9/0953 |
| 2017/0317628 A1 | 11/2017 | Renner | |

(Continued)

OTHER PUBLICATIONS

European Office Communication with extended search report Appln No. 22205403.3 dated May 9, 2023.

(Continued)

*Primary Examiner* — Tiffany T Tran
(74) *Attorney, Agent, or Firm* — McAndrews, Held & Malloy, Ltd.

(57) ABSTRACT

An example welding power supply includes: power conversion circuitry configured to convert supply power to welding current and to output the welding current to at least one of a shielded metal arc welding (SMAW) electrode, a gas tungsten arc welding (GTAW) electrode, or a gouging torch; a voltage sense circuit configured to measure an output voltage of the power conversion circuitry; and control circuitry configured to: determine a droop slope based on an arc control parameter; determine a reference voltage corresponding to an amperage parameter; set a target current by adjusting the amperage parameter based on the droop slope and based on a difference between the output voltage and the reference voltage; and control the power conversion circuitry using a current-controlled control loop based on the target current.

14 Claims, 8 Drawing Sheets

(56) References Cited

U.S. PATENT DOCUMENTS

| | | | |
|---|---|---|---|
| 2018/0021872 A1* | 1/2018 | Smith .................. | B23K 9/0956 |
| | | | 219/130.33 |
| 2018/0043454 A1* | 2/2018 | Smith .................. | B23K 9/1006 |
| 2019/0091790 A1 | 3/2019 | Mnich | |
| 2019/0291201 A1 | 9/2019 | Bowman | |

OTHER PUBLICATIONS

Int'l Search Report and Written Opinion Appln No. PCT/US2021/046611 mailed Dec. 21, 2021.

\* cited by examiner

WELDING POWER SUPPLIES HAVING DYNAMIC CURRENT RESPONSES

RELATED APPLICATIONS

The present application is a continuation-in-part of U.S. patent application Ser. No. 17/405,356, filed Aug. 18, 2021, entitled "WELDING POWER SUPPLIES HAVING DYNAMIC CURRENT RESPONSES," and claims the benefit of U.S. Patent Application Ser. No. 63/067,402, filed Aug. 19, 2020, entitled "WELDING POWER SUPPLIES HAVING DYNAMIC CURRENT RESPONSES." The entireties of U.S. patent application Ser. No. 17/405,356 and U.S. Patent Application Ser. No. 63/067,402 are expressly incorporated herein by reference.

BACKGROUND

This disclosure relates generally to welding systems and, more particularly, to welding power supplies having dynamic current responses.

In the past, the stick welding market and, more specifically pipe welding applications, has been dominated by DC generator welding machines. The arc/welding characteristics inherent in a DC generator, which are determined by the magnetic design of the machine, provide high quality performance for pipe welding applications. The machine response can be changed by selecting taps on the DC generator magnetics and/or changing the resistance in the generator field circuit. Conventional electronic controlled inverter/high frequency switching welding power sources have not replicated the welding characteristics of a DC generator that make the DC generator attractive for stick welding applications. While the desirable behaviors are inherent in DC generators, such behaviors are not present in conventional high frequency switching welding power sources.

SUMMARY

Welding power supplies having dynamic current responses are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Disclosed examples provide a method for controlling the current response for stick welding processes. In stick welding, a short circuit occurs as a droplet of molten metal is transferred from the end of the welding electrode to the weld pool.

Conventionally, electronic/inverter welding power sources have controlled the welding current response during a short circuit by limiting the maximum short circuit current that the power source can deliver. The maximum short circuit current is controlled by the operator through what is called the "dig" control or "arc force" control. Conventionally, "dig" control or "arc force" control is accomplished through a knob or other adjustment on the user interface of the power source. Conventionally, the rate of rise of the current is fixed for inverter power supplies, and does not change as the arc force control setting (i.e., current limit) was increased or decreased.

In contrast with conventional electronic/inverter welding power sources, disclosed examples more closely reproduce or mimic portions of the response of a DC generator and allows the operator more freedom to manipulate the weld. In some examples, disclosed systems and methods provide both positive and negative droop control by adjusting the output current target of the current control loop based on a difference between the output voltage and a reference voltage, both in the positive and negative directions. Additionally or alternatively, disclosed example systems and methods respond to detected short circuits by increasing current based on an exponential relationship and/or respond to detected clearing of short circuits by decreasing current based on an exponential relationship.

Disclosed examples enable a tighter arc length to be maintained in stick welding pipe joints without causing sticking of the electrode to the pipe, which gives more flexibility between the various weld conditions, joint fit-up, and other pipe joint welding parameters. Disclosed examples also improve the speed and reliability for the operator to weld a pipe joint.

The terms "current" and "amperage" are used interchangeably herein.

Disclosed welding power supplies include: power conversion circuitry configured to convert supply power to welding current and to output the welding current to at least one of a shielded metal arc welding (SMAW) electrode or a gouging torch; a voltage sense circuit configured to measure an output voltage of the power conversion circuitry; and control circuitry configured to: control the power conversion circuitry using a current-controlled control loop based on a target current; while the output voltage is above a lower voltage limit, control the target current based on a difference between a reference voltage and the output voltage; and in response to detecting that the output voltage has decreased below the lower voltage limit, control a welding current output by the power conversion circuitry based on a first exponential relationship.

Some example welding power supplies further include an engine configured to drive a generator, the generator configured to provide the supply power to the power conversion circuitry. Some example welding power supplies further include a user interface configured to receive the arc control parameter. In some example welding power supplies, the first exponential relationship is not based on a voltage error between the lower voltage limit and the output voltage.

In some example welding power supplies, the control circuitry is configured to, in response to detecting that the output voltage has increased above the lower voltage limit, control the welding current output by the power conversion circuitry based on a second exponential relationship and the arc control parameter. In some example welding power supplies, the second exponential relationship is not based on a voltage error between the lower voltage limit and the output voltage. In some example welding power supplies, the at least one of the first exponential relationship or the second exponential relationship comprises a parabolic relationship with respect to time. In some example welding power supplies, the reference voltage is between 25V and 30V. In some example welding power supplies, the reference voltage is between 26V and 28V.

In some example welding power supplies, the control circuitry is configured to limit the welding current output based on an upper output current limit while the output voltage is less than the lower voltage limit. Some example welding power supplies further include an input device configured to receive an input, in which the arc control parameter is based on the input. In some example welding power supplies, the control circuitry is configured to, in response to detecting that the output voltage has increased above the lower voltage limit, control the welding current output by the power conversion circuitry based on a current setpoint. In some example welding power supplies, the control circuitry is configured to: while the output voltage is less than the reference voltage, control the target welding current output by the power conversion circuitry to have a first amps-per-volt rate; and while the output voltage is greater than the reference voltage, to have a second amps-per-volt rate, different than the first amps-per-volt rate, while the output voltage is less than the reference voltage.

In some example welding power supplies, the control circuitry is configured to, in response to detecting that the output voltage has not increased above the lower voltage limit within a threshold time period while controlling the power conversion circuitry to output the welding current based on the first exponential relationship, control the power conversion circuitry to output the welding current at an upper current limit. Some example welding power supplies further include an input device configured to receive an input, the upper current limit being based on the input. Some example welding power supplies further include a voltage compensator configured to modify at least one of the lower voltage limit or the reference voltage, based on a calculated voltage drop in at least one of a weld cable or a work cable.

In some example welding power supplies, the voltage sense circuit is configured to measure the output voltage proximate an arc generated using the welding current. In some example welding power supplies, the lower voltage limit is approximately 19 volts.

Other disclosed example welding power supplies include: power conversion circuitry configured to convert supply power to welding current and to output the welding current to at least one of a shielded metal arc welding (SMAW) electrode, a gas tungsten arc welding (GTAW) electrode, or a gouging torch; a voltage sense circuit configured to measure an output voltage of the power conversion circuitry; and control circuitry configured to: determine a droop slope based on an arc control parameter; determine a reference voltage corresponding to an amperage parameter; set a target current by adjusting the amperage parameter based on the droop slope and based on a difference between the output voltage and the reference voltage; and control the power conversion circuitry using a current-controlled control loop based on the target current.

In some example welding power supplies, the control circuitry is configured to determine the reference voltage based on a predetermined National Electrical Manufacturers Association (NEMA) voltage-amperage (V-A) curve. In some example welding power supplies, the control circuitry is configured to set the target current based on the droop slope and the difference between the output voltage and the reference voltage down to an output voltage corresponding to a short circuit. In some such examples, the output voltage that corresponds to the short circuit is substantially zero volts.

In some example welding power supplies, the control circuitry is configured to: determine, based on the arc control parameter and the amperage parameter, at least one of an upper voltage limit or a lower current limit; and set the target current based on the at least one of the upper voltage limit or the lower current limit. In some example welding power supplies, the control circuitry is configured to determine the reference voltage based on a predetermined linear voltage-amperage (V-A) curve. Some example welding power supplies further include an engine configured to drive a generator, in which the generator is configured to provide the supply power to the power conversion circuitry. Some example welding power supplies further include a user interface configured to receive at least one of the arc control parameter or the amperage parameter.

Figure 1:
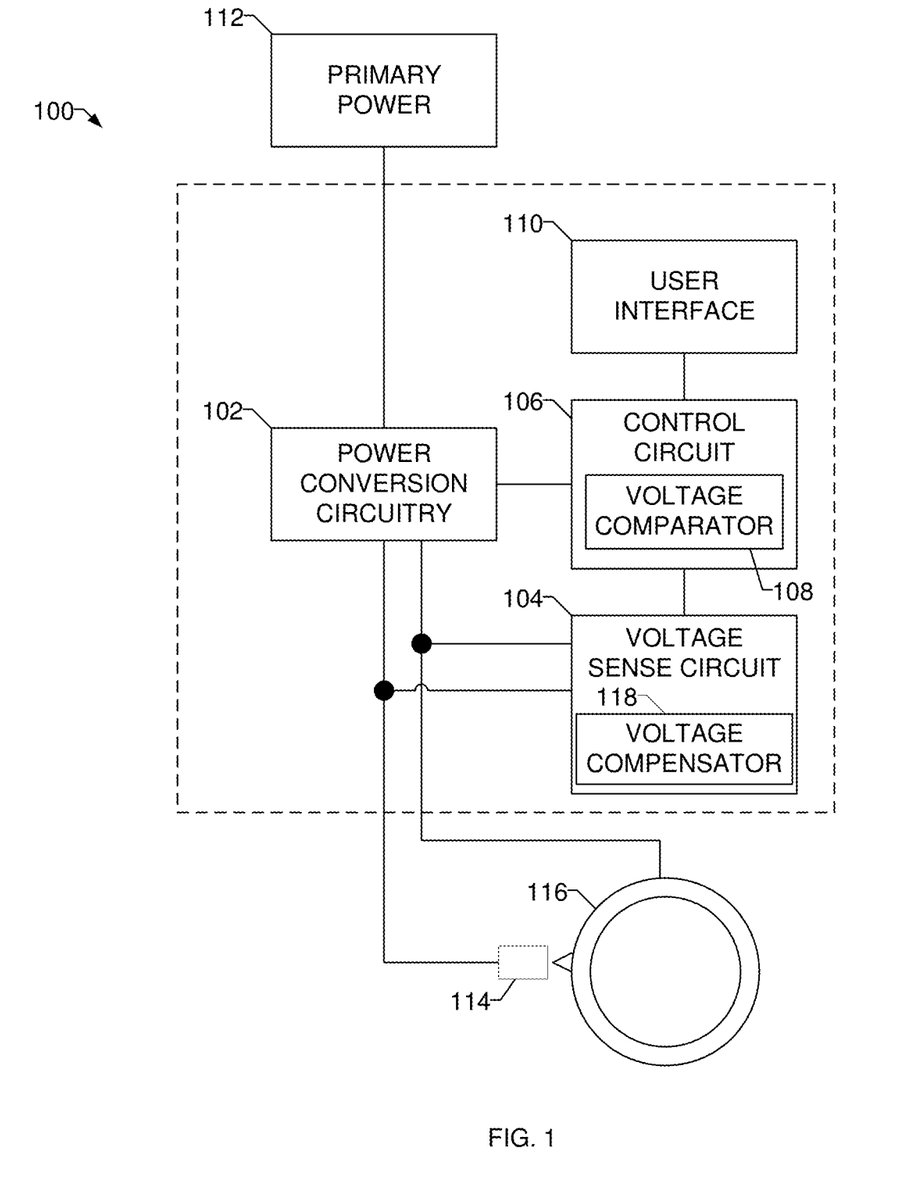
FIG. 1 is a schematic diagram of an example welding power supply having adjustable current ramping rates, in accordance with aspects of this disclosure.

FIG. 1 is a schematic diagram of an example welding power supply 100 having adjustable current ramping rates. The example welding power supply 100 is a power conversion circuitry 102, a voltage sense circuit 104, control circuitry 106, a voltage comparator 108, and a user interface 110. The example welding power supply 100 enables a welder to perform shielded metal arc welding (SMAW), also referred to as "Stick" welding. However, disclosed examples may be used to control the output for gouging operations and/or gas tungsten arc welding (GTAW) operations.

The power conversion circuitry 102 of FIG. 1 converts primary power 112 to welding-type power. Example power conversion circuitry 102 may include a switched mode power supply (or "inverter") topology. The primary power 112 may be any suitable power source, such as utility (e.g., mains) power, engine/generator power, and/or any combination of utility power and engine power. The welding-type power has an output current based on a current control loop. For example, the output current and/or weld voltage may be controlled based on a current setpoint and/or a voltage setpoint selected via the user interface 110. The power conversion circuitry 102 outputs weld power to a weld torch 114, such as a stick electrode holder. The weld torch 114 facilitates establishing a welding arc at a workpiece 116.

The voltage sense circuit 104 measures the weld voltage. The weld voltage may refer to the output voltage of the welding power supply 100 and/or a measured arc voltage. In the example of FIG. 1, the voltage sense circuit 104 samples or measures the weld voltage at the output studs of the welding power supply 100. In some other examples, the voltage sense circuit 104 may include sense leads to measure a weld voltage at the workpiece 116 and/or at another location in the weld circuit.

The measured weld voltage is passed through an analog filter circuit. An example filter is a 4th order filter with a corner frequency of 4 KHz. The output voltage feedback is supplied to the control circuitry 106. The voltage sense circuit 104 and/or the voltage comparator 108 may implement an analog-to-digital converter to convert the voltage to a digital value. The control circuitry 106 also filters the voltage feedback via software, firmware, and/or hardware. In some examples, the output voltage is compensated for voltage drops that occur over the weld cables.

The control circuitry 106 controls the output current and/or weld voltage output by the power conversion circuitry 102 using a current control loop. The user interface 110 may include a user input device to receive an amperage parameter (e.g., an output current setpoint). The control circuitry 106 executes the current control loop based on the output voltage information provided by the voltage sense circuit 104.

In some examples the current control loop is implemented by the power conversion circuitry 102. The voltage comparator 108 and the calculations to increase and/or decrease the current are implemented in software executed by the control circuitry 106, which outputs a current command as an output to the current control loop implemented by the power conversion circuitry 102. In some other examples, the current control loop is implemented in software executed by the control circuitry 106, which controls the weld output of the power conversion circuitry 102.

The voltage comparator 108 of the control circuitry 106 compares the measured output voltage to one or more thresholds to determine a current control scheme. For example, when the voltage comparator 108 determines that the output voltage is between an upper droop voltage limit and a lower droop voltage limit (e.g., within a droop mode range), the control circuitry 106 controls the power conversion circuitry 102 to output the welding current by adjusting a target current of the current-controlled control loop, relative to an amperage parameter or current setpoint (e.g., the current set by the operator), based on a difference between the output voltage and a reference voltage. For example, the control circuitry 106 reduces the target output current as the output voltage increases and increases the target output current as the output voltage decreases. In some examples, the droop rate (e.g., A/V) above the reference voltage may be different than the droop rate below the reference voltage.

In some examples, the control circuitry 106 may implement a voltage range around the reference voltage (e.g., +/−0.5V, +/−1V, etc.) within which the control circuitry 106 controls the target output current to be the current setpoint.

When the voltage comparator 108 determines that the output voltage is below the lower voltage limit, the example control circuitry 106 may control the output current using a short circuit mode or dig mode. In the dig mode, the example control circuitry 106 attempts to clear a short circuit condition between the electrode and the workpiece 116. An example dig mode control technique involves controlling one or more increasing ramp rates of the welding current output by the power conversion circuitry 102 and, in response to detecting that the output voltage has increased above the first lower voltage limit (e.g., the short circuit has been cleared and the arc re-established), controlling one or more decreasing ramp rates of the welding current output by the power conversion circuitry 102.

In some examples, the control circuitry 106 selects arc control parameters based on an arc control parameter input(s). The arc control parameter input(s) may be received from the user interface 110. For example, the user interface 110 may include a slope control input, an arc control input, a dig range input, and/or an amperage parameter input to enable a user to select or tune the arc control parameter input(s). In some examples, the user interface 110 input device mimics a tap selection and tuning selection typically found on DC generator type welding power supplies. In the example of FIG. 1, the control circuitry 106 executes the current control loop at a rate of at least 15 kilohertz (kHz).

In some examples, a single input parameter, such as an arc control parameter, may be used to adjust the current control in both the droop range and the dig range. For example, the arc control parameter may be adjusted between "stiffer" (or equivalent) values and "softer" (or equivalent) values. A stiffer value of the arc control parameter may cause a higher amps/volt rate within the droop range (e.g., the control circuitry 106 changes the target current by a larger amount per unit change in the output voltage), and cause a more rapid increase in current in the dig range (e.g., one or more factors or constants in the exponential relationship may be adjusted). Conversely, a softer value of the arc control parameter may cause a lower amps/volt rate within the droop range (e.g., the control circuitry 106 changes the target current by a lower amount per unit change in the output voltage), and cause a less rapid increase in current in the dig range (e.g., one or more factors or constants in the exponential relationship may be adjusted). In some other examples, the dig range and the droop range may be controlled via different parameters, and/or one or both of the dig range and/or the droop range may be fixed.

The control circuitry 106 provides dynamic current responses to provide weld operators with excellent arc behavior and improved weld operator control of the arc. As described in more detail below, the control circuitry 106 controls the power conversion circuitry 102 to control the output current at least in part based on the output voltage. When the output voltage is between a first upper droop voltage limit and a lower droop voltage limit, the control circuitry 106 controls the power conversion circuitry 102 to output the welding current based on an amperage parameter and a difference between the output voltage and a reference voltage 216. In response to detecting that the output voltage has decreased below the lower voltage limit, the control circuitry 106 controls an increasing welding current output by the power conversion circuitry 102 and, in response to detecting that the output voltage has increased above the lower voltage limit 202, and controls a decreasing welding current output by the power conversion circuitry 102 when the short circuit has cleared.

When the voltage comparator 108 determines that the output voltage is above the first upper voltage limit and below a second upper voltage limit, the example control circuitry 106 controls the power conversion circuitry 102 to output the welding current based on a first voltage-amperage (V-A) relationship (e.g., a droop mode). An example V-A relationship that may be used in the droop mode involves a decrease in current output (relative to the amperage parameter) for a corresponding increase in voltage (e.g., voltage above the first upper voltage limit) relative to a reference voltage, and an increase in the current output (relative to the amperage parameter) for a corresponding decrease in voltage (e.g., voltage above the first upper voltage limit) relative to a reference voltage. The droop mode enables a weld operator to control the current input (and, thus, the heat input) to the weld by increasing the arc length (and, thus, the arc voltage), and is particularly useful in downhill welding and/or out-of-position welding where puddle control is desired. An example reference voltage is 27V. However, other reference voltages between 26V and 28V may be used. In some examples, the reference voltage may be between 25V and 30V.

Additionally or alternatively, the user interface 110 may enable selection of different stick welding operations, such as 6010 stick electrode welding, 7018 stick electrode welding, downhill pipe welding, or the like, as the arc control parameter input(s). The control circuitry 106 may select predetermined arc control parameters based on the selected stick welding operation.

In some examples, the control circuitry 106 may automatically identify the stick welding operation (e.g., electrode type) and select the predetermined current ramping rate based on the stick welding operation. The control circuitry 106 may identify a particular electrode type (e.g., XX18, XX10, etc.) by, for example, reading an identifier attached to the electrode and/or observing characteristics of the weld such as frequency and/or duration of short circuit events. For example, certain types of stick electrodes may result in short circuit events occurring within a range of frequencies.

In some examples, the control circuitry 106 identifies welding data corresponding to the output current, the weld voltage, a weld parameter input to the control circuitry 106, an electrode size, and/or an electrode type. The control circuitry 106 may select amperage and/or arc control parameters using welding data. For instance, a welder may specify a size and/or type of stick electrode via the user interface 110. In response, the control circuitry 106 identifies and selects a pre-tuned current ramping rate for use with the specified electrode.

In some examples, the control circuitry 106 stores weld data corresponding to a welding operation (e.g., one or more prior welding operations performed by an operator). The control circuitry 106 may select the arc control parameters using the stored data as the arc control parameter input(s). For example, the stored weld data may indicate how many short circuits occur during a time period to determine a short circuit rate. The control circuitry 106 may select the current ramping rate to adapt the dig response to the short circuit rate.

Example types of arc control parameters are described herein. The control circuitry 106 may use combinations of inputs to select the arc control parameters.

The control circuitry 106 executes the current control loop to control the output current. In the example of FIG. 1, the control circuitry 106 increases the output current based on the exponential relationship while the weld voltage corresponds to the short circuit condition. The control circuitry 106 may monitor the weld voltage during a short circuit to identify when a short circuit is about to clear. For example, when the weld voltage begins increasing (or increases for a certain number of consecutive samples), the control circuitry 106 may stop increasing the current to reduce the spatter that results from clearing the short circuit, and decrease the output current based on the same or a different exponential relationship until the output current reaches the current setpoint or other target current.

In some examples, the voltage sense circuit 104 includes a voltage compensator 118 to estimate an arc voltage based on one or more inputs. To estimate the arc voltage, the voltage compensator 118 may estimate a voltage drop caused by the weld cable and/or work cable, where the voltage drop would substantially affect the performance of the voltage thresholds. Example inputs that may be used to estimate the arc voltage and/or the voltage drop may include the output voltage, a weld cable resistance, a work cable resistance, an output current, and/or an output inductance.

Figure 2:
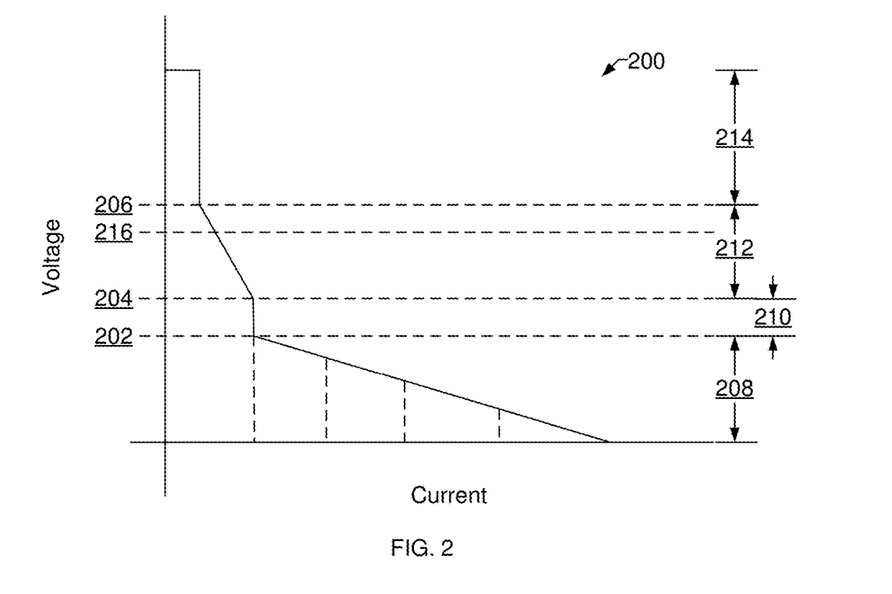
FIG. 2 is graph illustrating example voltage-amperage relationships that may be used by the example welding power supply of FIG. 1 to provide welding power.

FIG. 2 is graph illustrating an example V-A relationship 200 that may be used by the example welding power supply 100 of FIG. 1 to provide welding power. The example V-A relationship 200 of FIG. 2 may be defined as an output amperage set according to the output voltage, and includes three example voltage limits 202, 204, 206 and four voltage ranges 208, 210, 212, 214. The example voltage range 214 corresponds to a range of the power supply 100 at which the power supply 100 is not capable of outputting more output current at the given voltage.

The control circuitry 106 operates in a dig mode within the voltage range 208, when the output voltage is below the lower voltage limit 202. The dig voltage range 208 may be used by the control circuitry 106 of FIG. 1 to clear short circuit events while reducing spatter and/or electrode degradation. Example responses by the control circuitry 106 to measured output voltages below the lower voltage limit 202 are described below with reference to FIG. 4.

The control circuitry 106 operates in a current-controlled mode (e.g., a constant current mode, etc.) within voltage range 210, when the output voltage is between the lower voltage limit 202 and a lower droop voltage limit 204. In the voltage range 210, the control circuitry 106 controls the power conversion circuitry 102 using a current control loop to maintain a substantially constant current output. The control circuitry 106 may maintain the current output substantially equal to an upper current of the droop mode (e.g., used in voltage range 212), which may be higher than the amperage parameter input via the user interface 110.

An example voltage range 210 is between 2-5 volts or, more specifically, about 3 volts. An example nominal lower voltage limit 202 is about 19V and an example nominal lower droop voltage limit 204 is between about 21V and about 24V, inclusive.

The control circuitry 106 operates in a droop mode within voltage range 212, when the output voltage is between the lower droop voltage limit 204 and an upper droop voltage limit 206. In the droop mode, the control circuitry 106 controls the output current as a function of a difference between the output voltage and a reference voltage 216. As the output voltage increases above the reference voltage 216 (up to the upper droop voltage limit 206), the control circuitry 106 decreases the current target to reduce the output current. Conversely, as the output voltage decreases below the reference voltage 216, the control circuitry 106 increases the current target to increase the output current (down to the lower droop voltage limit 204). An example reference voltage 216 is about 27V. However, the reference voltage 216 may be between 25V and 30V. In some examples, the reference voltage 216 is between 26V and 28V. In some examples, the lower droop voltage limit 204, the upper droop voltage limit 206, and/or the reference voltage 216 may be configured based on the configured based on the selected amperage parameter (e.g., the current setpoint). The nominal lower voltage limit 202, the lower droop voltage limit 204, the upper droop voltage limit 206, and/or the reference voltage 216 may be modified by the control circuitry 106 and/or the voltage compensator 118 based on detecting substantial voltage drops in the weld cable and/or the work cable. Substantial voltage drops when operating the power conversion circuitry 102 in a current-controlled mode results in an increase in the output voltage at the power conversion circuitry 102.

A number of parameters of the V-A relationship 200 may be modified by the weld operator. For example, the amperage in the dig mode may be limited to limit the current that can be output to clear short circuits. As illustrated in FIG. 2, example limits 218a, 218b, 218c, 218d may be implemented, although any other limit between the amperage parameter and the maximum current output capability of the power conversion circuitry 102 may be used. When the output current reaches the configured limit 218a, 218b, 218c, 218d, the output current does not exceed the configured limit 218a, 218b, 218c, 218d.

The example voltage limits 202, 204, 206 and/or the reference voltage 216 may be modified via the user interface 110 and/or via the voltage compensator 118. For example, the voltage limits 202-206 may be increased based on an increase in the voltage drop over the weld and work cables. In some examples, the voltage limits 202, 204 defining the current-controlled mode (e.g., the voltage range 210) may be constrained to be have a difference between 2-5 volts.

The slope of the droop mode may be adjusted to increase or decrease the current reduction per unit increase in output voltage. In some examples, the slope may be set between −1.5 amperes per volt (A/V) and −3.0 A/V. The current change is made relative to the amperage parameter, which may also be adjusted to control the output current in current-controlled mode (e.g., the voltage range 210) (e.g., moving the vertical portion of the V-A relationship 200 within the voltage range 210 to the left or right). In some examples, the slope between the reference voltage 216 and the upper droop voltage limit 206 is different than the slope between the reference voltage 216 and the lower droop voltage limit 204.

In some examples, the lower droop voltage limit 204 and the upper droop voltage limit 206 (e.g., the limits of the droop voltage range 212) are adjusted in response to changes in the reference voltage 216, which may occur based on changes to the amperage parameter, arc control parameter, and/or any other parameter(s). For example, the lower droop voltage limit 204 and the upper droop voltage limit 206 may be increased or decreased by a same amount as a change in the reference voltage 216 to maintain a constant total voltage range of the droop mode 212. In some examples, the lower droop voltage limit 204 may be decreased as low as the lower voltage limit 202 in response to changes in the reference voltage 216. Additionally or alternatively, the upper droop voltage limit 206 and/or the slope in the droop mode 212 may be set or modified separately (e.g., independently) from configuration of the lower droop voltage limit 204 and/or the slope in the dig mode 208.

Figure 3:
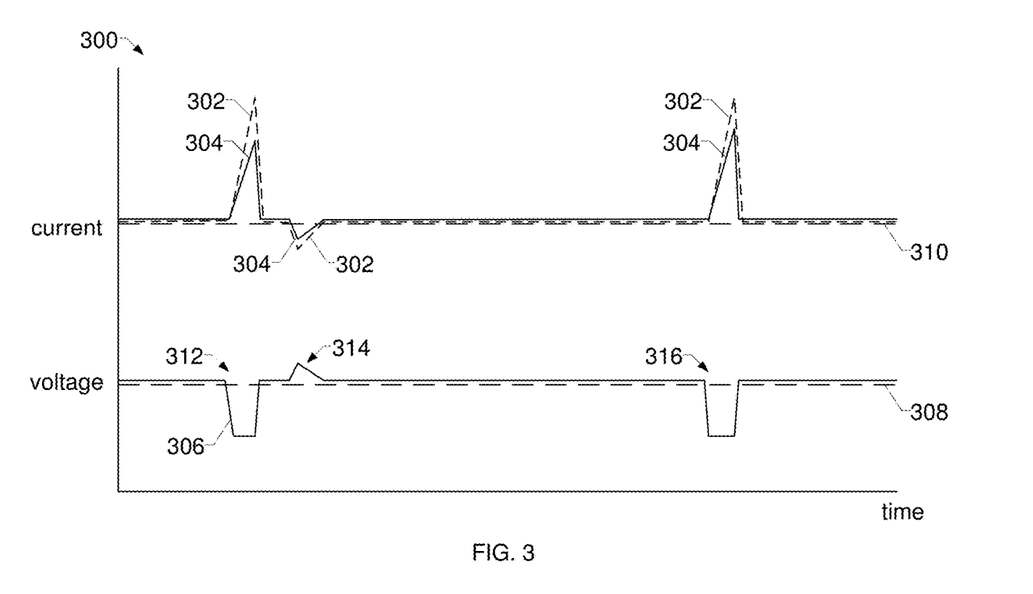
FIG. 3 is a graph illustrating an example current response that may be implemented by the welding power supply of FIG. 1 in response to detecting a change in voltage from a reference voltage.

FIG. 3 is a graph 300 illustrating example output currents 302, 304 that may be implemented by the welding power supply 100 of FIG. 1 in response to detecting a change in voltage 306 from a reference voltage 308. The output current 302 represents a "stiffer" arc, in which the arc control parameter is set to a stiffer value. The output current 304 represents a "softer" arc, in which the arc control parameter is set to a softer value.

While the output voltage 306 is substantially equal to the reference voltage 308, the output currents 302, 304 are substantially equal to a current setpoint value 310. At a first example time 312, the output voltage 306 drops below the reference voltage 308. In response to the decrease in voltage, the control circuitry 106 controls the output currents 302, 304 to increase above the current setpoint value 310 by an amount proportional to the drop in the voltage 306, with the stiffer output current 302 increasing more (e.g., a higher slope) than the softer output current 304.

At a second example time 314, the output voltage 306 increases above the reference voltage 308. In response to the decrease in voltage, the control circuitry 106 controls the output currents 302, 304 to drop below the current setpoint value 310 by an amount proportional to the increase in the voltage 306, with the stiffer output current 302 decreasing more (e.g., a higher slope) than the softer output current 304.

At a third example time 316, the output voltage 306 again decreases below the reference voltage 308. In response to the decrease in voltage, the control circuitry 106 again controls the output currents 302, 304 to increase above the current setpoint value 310 by an amount proportional to the drop in the voltage 306, in a manner similar to the increases at the time 312.

Figure 4:
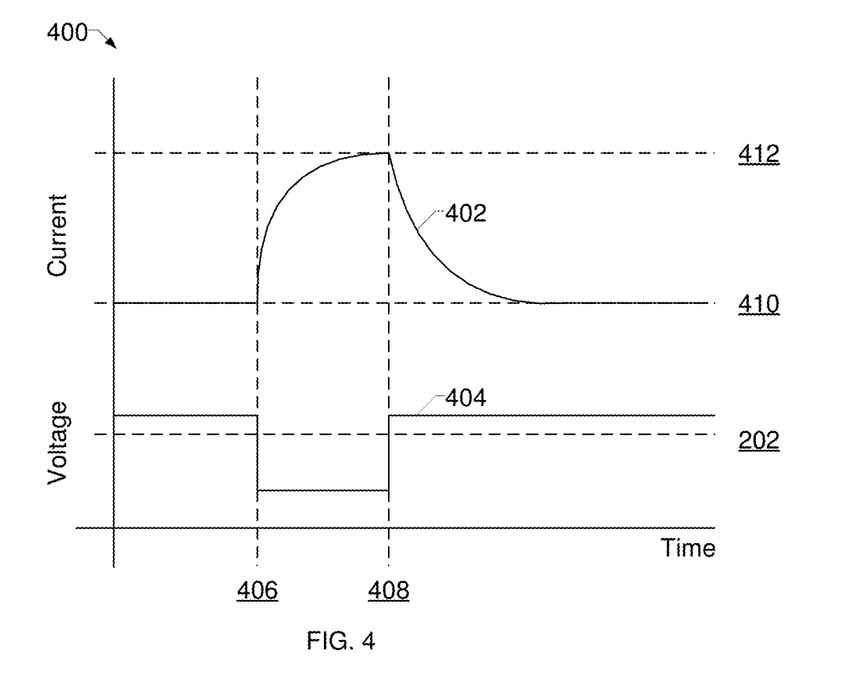
FIG. 4 is a graph illustrating an example current response that may be implemented by the welding power supply of FIG. 1 in response to detecting a drop in output voltage below a lower voltage threshold.

FIG. 4 is a graph 400 illustrating an example output current 402 that may be implemented by the welding power supply 100 of FIG. 1 in response to detecting a drop in output voltage 404 below a lower voltage threshold (e.g., the lower voltage limit 202 of FIG. 2).

At a first time 406, the output voltage 404 drops below the lower voltage limit 202, such as due to a short circuit between the welding electrode held by the welding torch 114 and the workpiece 116. In response to detecting the drop in the output voltage 404 (e.g., via the voltage sense circuit 104), the control circuitry 106 controls the output current 402 to increase based on an exponential (e.g., parabolic) relationship with respect to time. Equation 1 below illustrates an example exponential relationship:

$$i = k - a(t-h)^2 \qquad \text{(Equation 1)}$$

In equation 1, i is the output current, t is the time in the short circuit (e.g., the elapsed time since detecting that the voltage 404 has decreased below the lower voltage limit 202), k is upper current limit (e.g., the dig limit, which may be automatically set or set by the user), h is a value based on the arc control parameter, and a is a variable that is calculated based on the values of k and h (or the arc control parameter and the dig limit) to cause the output current curve to begin at the output current prior to the short circuit (e.g., current 410) and end at the upper dig current limit (e.g., current limit 412). In some examples, the exponential relationship causes the output current curve to mimic or resemble the output current curve of an engine-driven generator, which is influenced by the magnetic properties (e.g., inductance) of the generator components.

If the output current 402 reaches the current limit 412, the control circuitry 106 controls the output current 402 to be equal to the current limit 412 (e.g., to not exceed the current limit 412). If the control circuitry 106 detects that the electrode is stuck to the workpiece (e.g., the output current 402 is at the current limit 412 for at least a threshold time), the control circuitry 106 may stop the output and alert the operator that the short circuit was not cleared.

At a second time 408, the short circuit is cleared and the arc is reinitiated, causing the output voltage 404 to increase above the lower voltage limit 202. In response to detecting the increase in voltage 404 above the lower voltage limit 202, the control circuitry 106 controls the output current 402 to decrease to the current 410. In some examples, the decrease in the current 402 may be according to another exponential relationship, which may be similar to Equation 1 but causes the output current to decrease from the current at which the short circuit was cleared. In some other examples, the decrease in the current 402 may be immediate (e.g., as fast as the power conversion circuitry 102) can change the output current, and/or via one or more linear current ramps to the current 410.

Figure 5:
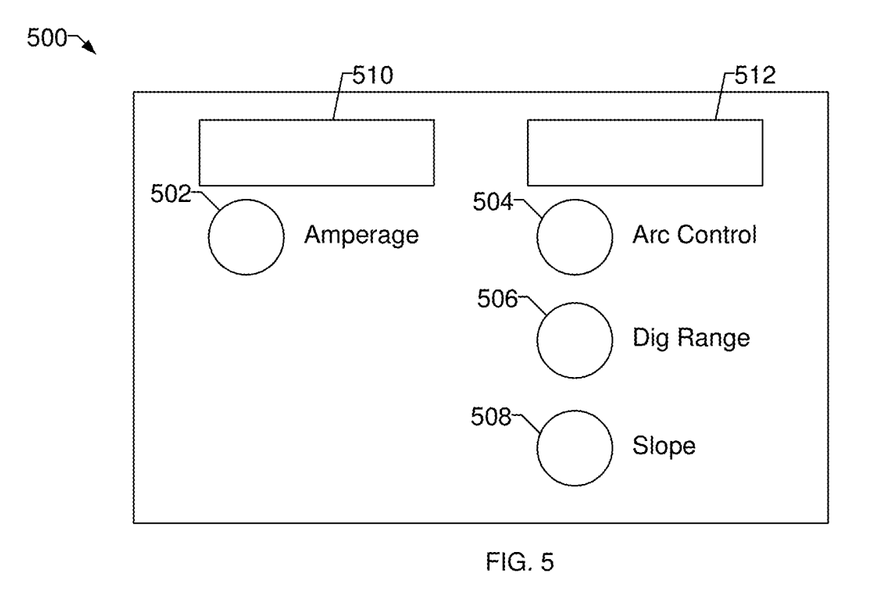
FIG. 5 illustrates an example user interface that may be used to implement the user interface of the example welding power supply of FIG. 1 to receive inputs for amperage, arc control, dig range, and/or slope parameters.

FIG. 5 illustrates an example user interface 500 that may be used to implement the user interface 110 of the example welding power supply 100 of FIG. 1 to receive inputs for amperage, arc control, dig range, and/or slope parameters. The example user interface 500 includes input devices 502, 504, 506, 508 for the amperage, arc control, dig range, and/or slope parameters, and output devices 510, 512 to provide an indication of the current value for each of the output parameters.

The example amperage input device 502 enables the weld operator to set the amperage parameter (e.g., the output amperage at the reference voltage 216 of FIG. 2).

The example arc control input device 504 receives an input from the weld operator to control the slope of the output current in the droop mode of FIG. 2 (e.g., output voltages between the voltage limits 204, 206) and to control one or more factors in the exponential relationships of FIG. 4 (e.g., to increase or decrease the time required to reach the dig current limit 412 and/or to reach the current level 410). Configuration of the current slope in the droop mode and/or the exponential relationship in the dig mode may be considered in terms of a "softer" arc (e.g., more fluid) or a "stiffer" arc (e.g., more penetrating).

The dig range input device 506 receives an input from the weld operator to set the upper current limit on the short clearing current (e.g., set the current limit 412 of FIG. 4). In some examples, control of the droop mode and/or the current limit 412 are separated from the exponential relationship of FIG. 4 to provide greater control to the weld operator to fine tune arc characteristics, thereby providing a greater degree of arc control.

In some examples, a slope input device 508 enables the weld operator to adjust the slope of the inverse V-A relationship in the droop mode (e.g., the voltage range 212). An example slope range may be −1.5 to −3 Amperes per volt (A/V) above and/or below the reference voltage 216 (e.g., 27 volts, which may be modified based on weld cable voltage drop).

One or more of the input devices 502-508 may be combined into a single input device, using a menu system to access the desired parameters to be modified. In some examples, one of the input devices 504-508 (e.g., the dig range input device 506) configures a combination of droop and dig parameters, such as simultaneously increasing the dig current limit 412, decreasing the time to reach the dig current limit 412, and increasing the droop slope (e.g., toward −3 A/V), or simultaneously decreasing the dig current limit 412, increasing the time to reach the dig current limit 412, and decreasing the slope (e.g., toward −1.5 A/V). Configuring two, three, or four related parameters to a single input (e.g., while improving arc characteristics relative to conventional control schemes) reduces control by the weld operator but provides simplicity for weld operators who are uninterested in granular control.

Additionally or alternatively, the input devices 502-508 may be combined into fewer input devices, using menus and/or other types of input devices to select one or more parameters to be configured via a given input device.

Figure 6A:
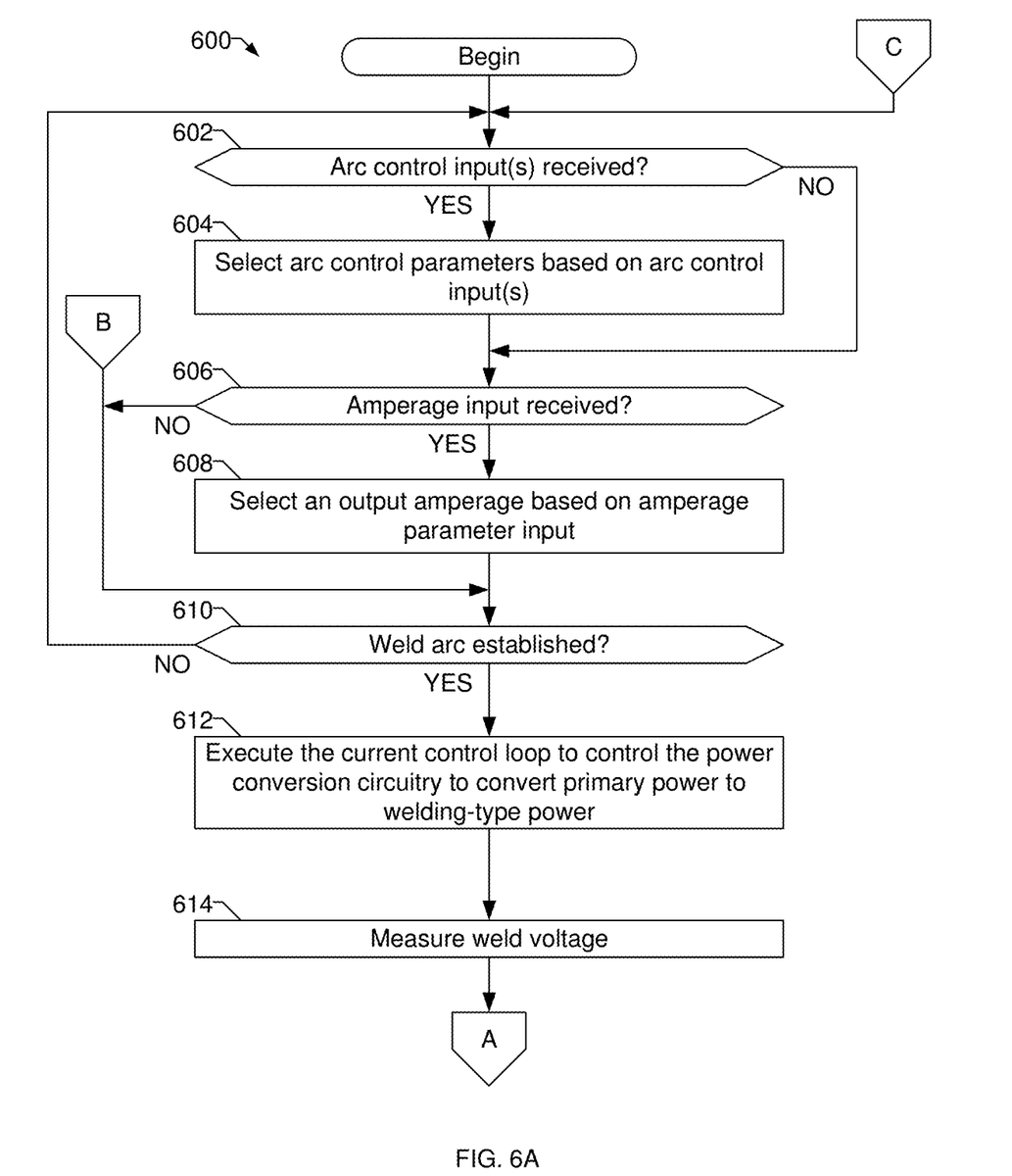
FIGS. 6A and 6B collectively illustrate a flowchart representative of example machine readable instructions which may be executed by the example welding power supply of FIG. 1 to provide power for a welding operation.
Figure 6B:
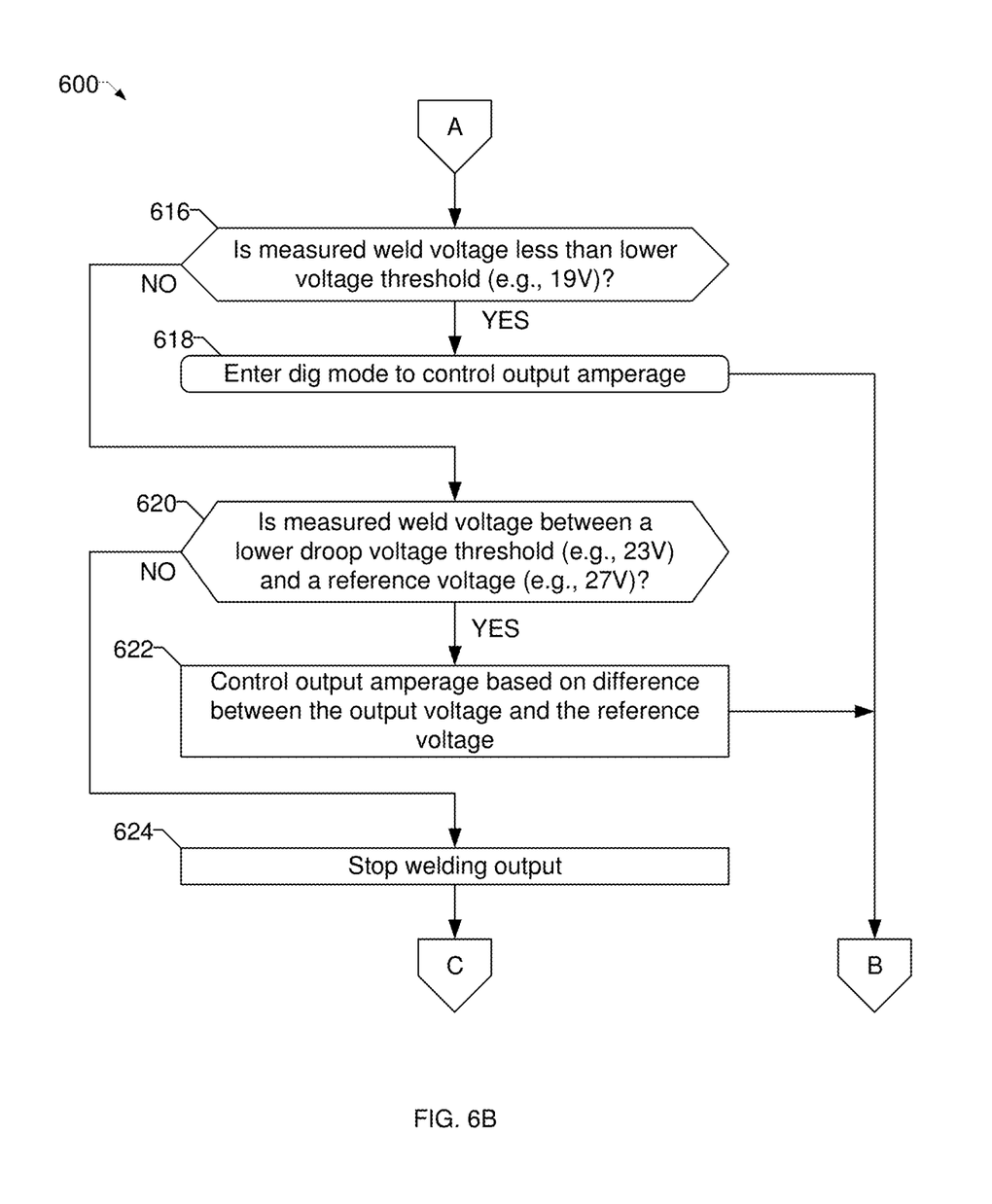

FIGS. 6A and 6B collectively illustrate a flowchart representative of example machine readable instructions 600 which may be executed by the example welding power supply 100 of FIG. 1 to provide power for a welding operation.

At block 602, the control circuitry 106 determines whether one or more arc control input(s) have been received. The example arc control input(s) may include any of the arc control input device 504, the dig range input device 506, and/or the slope input device 508, and/or any other input that modifies current parameters. If arc control input(s) have been received (block 602), at block 604 the control circuitry 106 selects arc control parameter(s) based on the arc control inputs. For example, the control circuitry 106 may configure one or more of the amperage parameter, the positive and/or negative the amperage-voltage slope in the droop mode, the arc control parameter, the dig range (e.g., the dig current limit 412), the increasing and/or decreasing ramp rates in the dig mode, and/or any other parameter.

After selecting the arc control parameters (block 604), or if no arc control input(s) are received (block 602), at block 606 the control circuitry 106 determines whether an amperage input has been received. For example, the control circuitry 106 may monitor for inputs to the amperage input device 502 specifying an output amperage. If an amperage input has been received (block 606), at block 608 the control circuitry 106 selects an output amperage based on the amperage parameter input. The control circuitry 106 uses the output amperage within the output voltage range 210 of FIG. 2.

After selecting the output amperage (block 608), or if no amperage input is received (block 606), at block 610 the control circuitry 106 determines whether the welding arc is established. For example, the control circuitry 106 may determine whether the current control loop is executing for controlling the power conversion circuitry 102. If the arc is not established (block 610), control returns to block 602.

If the welding arc is established (block 610), at block 612 the control circuitry 106 executes the current control loop to control the power conversion circuitry 102 to convert the primary power 112 to welding-type power. At block 614, the voltage sense circuit 104 and/or the voltage compensator 118 measure the weld voltage (e.g., the power supply output voltage, the arc voltage, etc.).

Turning to FIG. 6B, at block 616 the control circuitry 106 (e.g., via the voltage comparator 108) determines whether the measured weld voltage is less than a lower threshold voltage (e.g., the voltage limit 202). If the measured weld voltage is less than the lower voltage limit 202 (block 616), at block 618 the control circuitry 106 enters a dig mode to control the output amperage. An example method to implement block 618 is described below with reference to FIG. 7.

If the measured weld voltage is greater than the lower voltage limit 202 (block 616), at block 620 the control circuitry 106 determines whether the measured weld voltage is between a lower droop voltage limit 204 and an upper droop voltage limit 206. If the measured weld voltage is between the measured weld voltage is between a lower droop voltage limit 204 and an upper droop voltage limit 206 (block 620), at block 622 the control circuitry 106 controls the output amperage based on a difference between the output voltage and a reference voltage 216.

After entering and exiting the dig mode (block 618) and/or controlling the output amperage (block 622), control returns to block 610. If the measured weld voltage is not between the measured weld voltage is between a lower droop voltage limit 204 and an upper droop voltage limit 206 (e.g., the output voltage is above the upper droop voltage limit 206) (block 620), at block 624 the control circuitry 106 stops the welding output. Control then returns to block 602.

Figure 7:
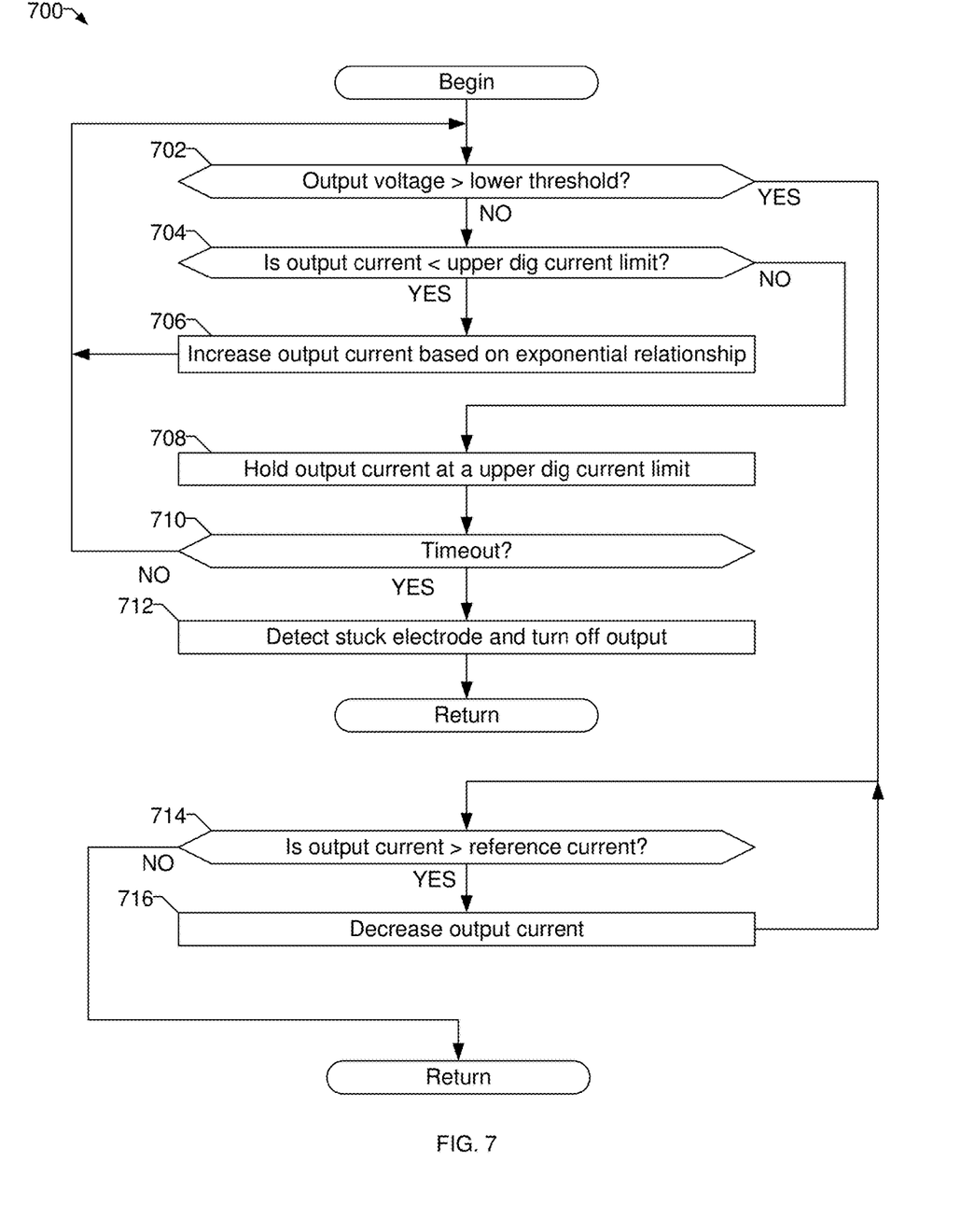
FIG. 7 is a flowchart representative of example machine readable instructions which may be executed by the example welding power supply of FIG. 1 to control output amperage in response to a measured weld voltage decreasing below a threshold, such as to clear a short-circuit.

FIG. 7 is a flowchart representative of example machine readable instructions 700 which may be executed by the example welding power supply 100 of FIG. 1 to control output amperage in response to a measured weld voltage decreasing below a threshold, such as to clear a short-circuit. The example instructions 700 may be executed to implement block 618 to execute a dig mode, such as in response to detecting a short circuit. The instructions 700 will be described below with reference to the graph 400 of FIG. 4.

At block 702, the control circuitry 106 determines whether the output voltage 404 is greater than a lower threshold (e.g., the lower voltage limit 202 of FIG. 2). If the output voltage 404 is not greater than the lower voltage limit 202 (block 702), at block 704 the control circuitry 106 determines whether the output current is less than an upper dig current limit (e.g., the upper dig current limit 412). The upper dig current limit 412 may be based on a dig range input (e.g., the input 506 of FIG. 5.

If the output current is less than an upper dig current limit (block 704), at block 706 the control circuitry 106 increases the output current 402 based on an exponential relationship. For example, the control circuitry 106 may be based on an exponential relationship such as Equation 1. Control then returns to block 702.

If the output current is not less than an upper dig current limit (block 704), at block 708 the control circuitry 106 holds the output current 402 at the upper dig current limit 412. At block 710, the control circuitry 106 determines whether a timeout has expired without an increase in the output voltage 404 above the lower voltage limit 202. If a timeout has not occurred (block 710), control returns to block 702.

If a timeout has occurred (block 710), at block 712 the control circuitry 106 detects a stuck electrode and turns off the output current. Control may then return to block 610 of FIG. 6A.

If the output voltage 404 is not greater than the lower voltage limit 202 (block 702), at block 714 the control circuitry 106 determines whether the output current is greater than the reference current (e.g., the current 410). If the output current 402 is greater than the reference current (block 714), at block 716 the control circuitry 106 decreases the output current 402. For example, the control circuitry 106 may decrease the output current based on a linear ramp, an exponential relationship similar to Equation 1, an immediate decrease, and/or any other relationship.

In some examples, the welding power supply 100 may omit or disable the dig mode and use the droop mode as far down as a short circuit voltage (e.g., substantially zero volts). By omitting the dig mode, the example welding power supply 100 may use a simpler control scheme while still providing effective arc control and short circuit clearing to the weld operator.

Figure 8:
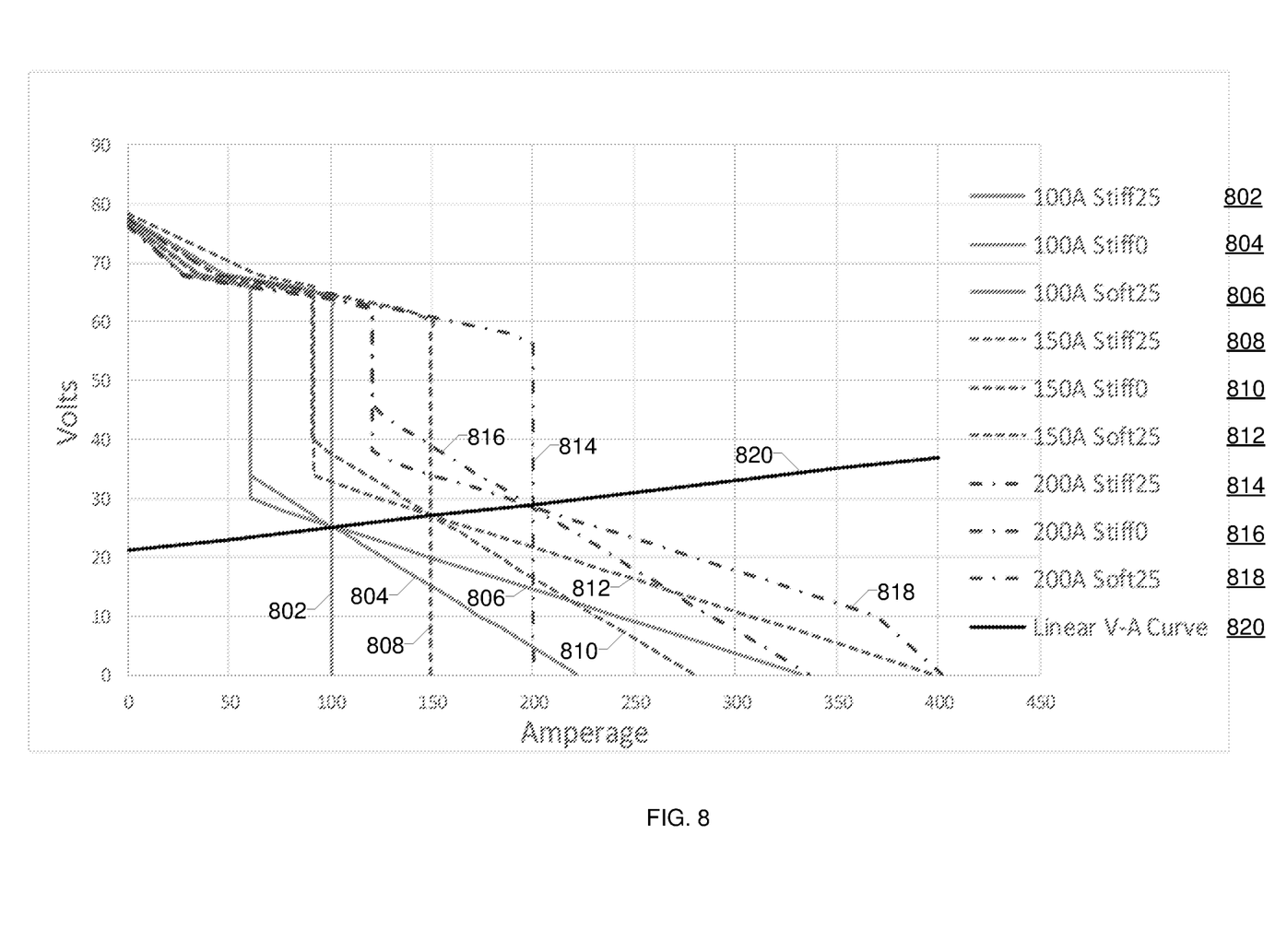
FIG. 8 is graph illustrating example voltage-amperage relationships that may be used by the example welding power supply of FIG. 1 to provide welding power using the droop mode.

FIG. 8 is graph illustrating example V-A relationships (also referred to as V-A curves) that may be used by the example welding power supply 100 of FIG. 1 to provide welding power using the droop mode. The graph includes an example V-A curve for combinations of amperage parameters (e.g., 50 A, 100 A, and 150 A amperage) and arc control parameters (e.g., Soft25 or softest arc, zero or medium soft/stiff arc, and Stiff25 or stiffest arc).

As shown in FIG. 8, the V-A curves 802, 804, 806, 808, 810, 812, 814, 816, 818 omit the dig mode illustrated in FIG. 2 below the lower voltage limit. As a result, the control circuitry 106 controls the output amperage based on the arc control parameter and based on a difference between the output voltage and the reference voltage. In the example of FIG. 8, the reference voltage is determined based on the selected amperage parameter, and may be further based on a predetermined linear V-A curve. For example, the National Electrical Manufacturers Association (NEMA) has established V-A curves, such as the example linear V-A curve 820 of FIG. 8, which may be used to determine the reference voltage based on the amperage parameter. The example control circuitry 106 selects as the reference voltage the voltage corresponding to the amperage parameter on the linear V-A curve 820. As shown in FIG. 8, each of the V-A curves 820 corresponding to the same amperage parameter has the same voltage at the predetermined V-A curve 820. However, the amperage may change from the predetermined V-A curve 820 based on the selected arc control value.

In some examples, the control circuitry 106 further determines an upper voltage limit and/or a lower current limit based on the arc control parameter and the amperage parameter. For example, the control circuitry 106 may control the target current in the droop mode until the voltage exceeds (or the current drops under) an upper knee portion of the corresponding V-A curve 802-818. If the weld voltage exceeds the upper voltage limit and/or the target current drops below the lower current limit, the control circuitry 106 may use a different control scheme to control the target current (e.g., to stop the weld due to an output voltage and/or output current approaching an open circuit).

Figure 9:
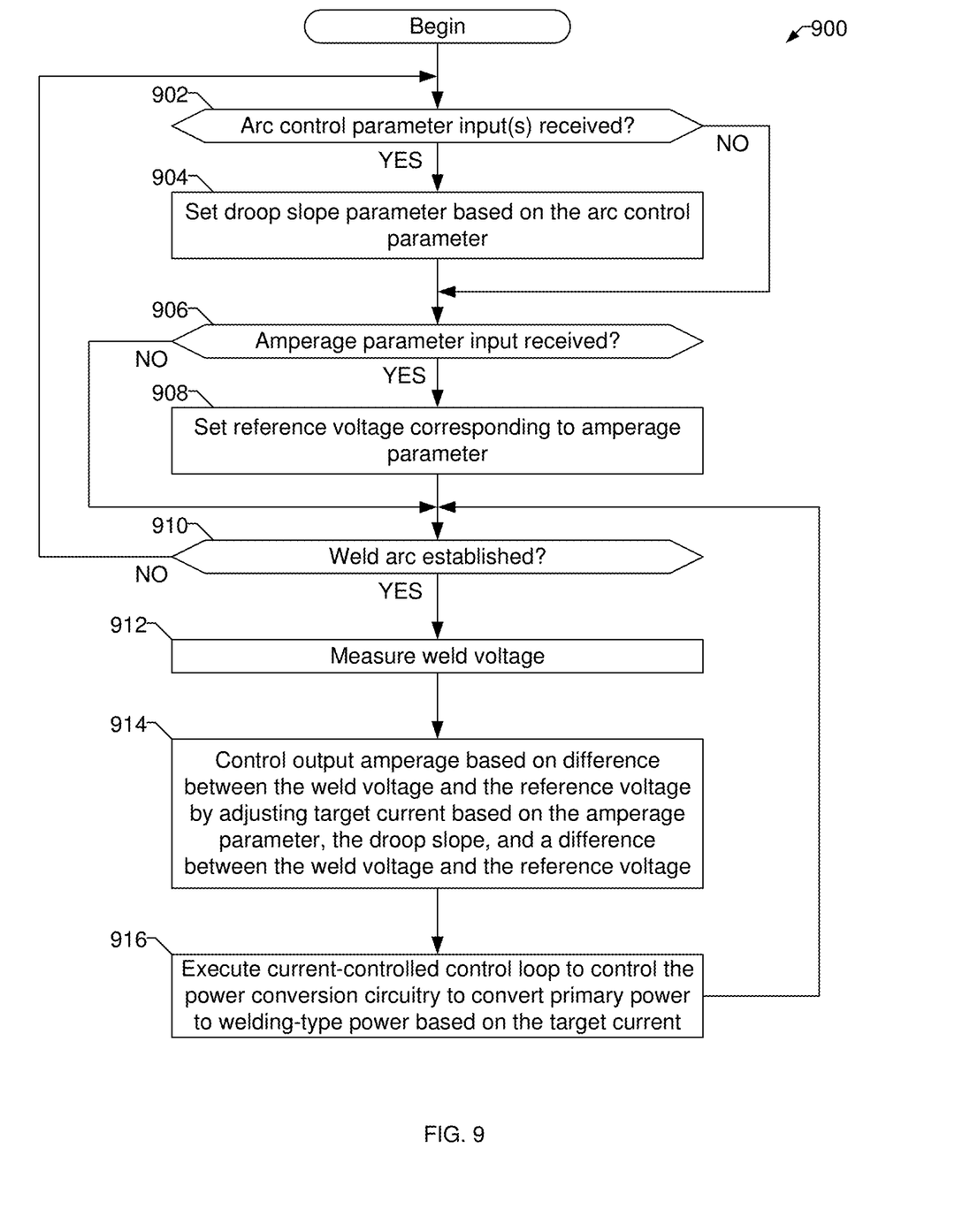
FIG. 9 is a flowchart representative of example machine readable instructions which may be executed by the example welding power supply of FIG. 1 to provide power for a welding operation.

FIG. 9 is a flowchart representative of example machine readable instructions 900 which may be executed by the example welding power supply 100 of FIG. 1 to provide power for a welding operation. For example, the control circuitry 106 may execute the instructions 900 to control the power conversion circuitry 102 using the droop mode down to a short circuit voltage (e.g., without using the dig mode).

At block 902, the control circuitry 106 determines whether one or more arc control input(s) have been received. The example arc control input(s) may include any of the arc control input device 504 and/or the slope input device 508, and/or any other input that modifies an arc control parameter, as discussed above with reference to block 602. If arc control input(s) have been received (block 902), at block 904 the control circuitry 106 sets a droop slope parameter based on the arc control parameter (e.g., as discussed above with reference to block 604 of FIG. 6A).

After setting the droop slope parameter (block 904), or if no arc control input(s) are received (block 902), at block 906 the control circuitry 106 determines whether an amperage parameter input has been received. For example, the control circuitry 106 may monitor for inputs to the amperage input device 502 specifying an output amperage. If an amperage input has been received (block 906), at block 908 the control circuitry 106 sets a reference voltage corresponding to the amperage parameter. For example, the control circuitry 106 may set the reference voltage based on a NEMA V-A curve or other predetermined linear V-A curve.

After setting the reference voltage (block 908), or if no amperage parameter input is received (block 906), at block 910 the control circuitry 106 determines whether the welding arc is established. For example, the control circuitry 106 may determine whether the current control loop is executing for controlling the power conversion circuitry 102. If the arc is not established (block 610), control returns to block 602.

If the welding arc is established (block 910), at block 912 the control circuitry 106 measures the weld voltage (e.g., via the voltage sense circuit 104 and/or the voltage comparator 108). At block 914, the control circuitry 106 controls the output amperage based on a difference between the weld voltage and the reference voltage, by adjusting a target current used by a current-controlled control loop. The control circuitry 106 adjusts the target current based on the amperage parameter, the droop slope, and the difference between the weld voltage and the reference voltage. For example, as shown in FIG. 8, the output amperage increases or decreases in reverse proportion to the weld voltage, at a droop slope or rate that is based on the arc control parameter.

At block 916, the control circuitry 106 executes the current-controlled control loop to control the power conversion circuitry 102 to convert the primary power 112 to welding-type power based on the target current.

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be a processing system integrated into a welding power supply with a program or other code that, when being loaded and executed, controls the welding power supply such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine readable storage media and to exclude propagating signals.

The control circuitry 106 may identify welding conditions of a given weld and automatically find the optimum value of rate of current rise for the welding conditions. An example control circuit implementation may be an Atmel Mega16 microcontroller, a STM32F407 microcontroller, a field programmable logic circuit and/or any other control or logic circuit capable of executing instructions that executes weld control software. The control circuit could also be implemented in analog circuits and/or a combination of digital and analog circuitry. Examples are described herein with reference to an engine-driven stick welder, but may be used or modified for use in any type of high frequency switching power source.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A welding power supply, comprising:
   power conversion circuitry configured to convert supply power to welding current and to output the welding current to at least one of a shielded metal arc welding (SMAW) electrode, a gas tungsten arc welding (GTAW) electrode, or a gouging torch;
   a voltage sense circuit configured to measure an output voltage of the power conversion circuitry; and
   control circuitry configured to:
   determine a droop slope parameter based on an arc control parameter;
   determine a reference voltage corresponding to a selected amperage parameter based on a predetermined linear voltage-amperage (V-A) curve having a positive slope;
   set a target current by adjusting the welding current relative to the selected amperage parameter based on the droop slope parameter and based on a difference between the output voltage and the reference voltage; and
   control the power conversion circuitry using a current-controlled control loop based on the target current.

2. The welding power supply as defined in claim 1, wherein the predetermined linear V-A curve is a predetermined National Electrical Manufacturers Association (NEMA) voltage-amperage (V-A) curve.

3. The welding power supply as defined in claim 1, wherein the control circuitry is configured to set the target current based on the droop slope parameter and the difference between the output voltage and the reference voltage down to an output voltage corresponding to a short circuit.

4. The welding power supply as defined in claim 3, wherein the output voltage corresponding to the short circuit is substantially zero volts.

5. The welding power supply as defined in claim 1, wherein the control circuitry is configured to:
   determine, based on the arc control parameter and the amperage parameter, at least one of an upper voltage limit or a lower current limit; and
   set the target current based on the at least one of the upper voltage limit or the lower current limit.

6. The welding power supply as defined in claim 1, further comprising an engine configured to drive a generator, the generator configured to provide the supply power to the power conversion circuitry.

7. The welding power supply as defined in claim 1, further comprising a user interface configured to receive at least one of the arc control parameter or the amperage parameter.

8. A welding power supply, comprising:
   power conversion circuitry configured to convert supply power to welding current and to output the welding current to at least one of a shielded metal arc welding (SMAW) electrode or a gouging torch;
   a voltage sense circuit configured to measure an output voltage of the power conversion circuitry; and
   control circuitry configured to:
   determine a droop slope parameter based on an arc control parameter;
   determine a reference voltage corresponding to a selected amperage parameter based on a predetermined linear voltage-amperage (V-A) curve having a positive slope;
   set a target current by adjusting the welding current relative to the selected amperage parameter based on the droop slope parameter and based on a difference between the output voltage and the reference voltage; and control the power conversion circuitry using a current-controlled control loop based on the target current.

9. The welding power supply as defined in claim 8, wherein the predetermined linear V-A curve is a predetermined National Electrical Manufacturers Association (NEMA) voltage-amperage (V-A) curve.

10. The welding power supply as defined in claim 8, wherein the control circuitry is configured to set the target current based on the droop slope parameter and the difference between the output voltage and the reference voltage down to an output voltage corresponding to a short circuit.

11. The welding power supply as defined in claim 10, wherein the output voltage corresponding to the short circuit is substantially zero volts.

12. The welding power supply as defined in claim 8, wherein the control circuitry is configured to:

determine, based on the arc control parameter and the amperage parameter, at least one of an upper voltage limit or a lower current limit; and set the target current based on the at least one of the upper voltage limit or the lower current limit.

13. The welding power supply as defined in claim 8, further comprising an engine configured to drive a generator, the generator configured to provide the supply power to the power conversion circuitry.

14. The welding power supply as defined in claim 8, further comprising a user interface configured to receive at least one of the arc control parameter or the amperage parameter.

* * * * *